US006317568B1

(12) United States Patent
Williams et al.

(10) Patent No.: US 6,317,568 B1
(45) Date of Patent: Nov. 13, 2001

(54) CAMERA WITH FILM WINDER RETRACTABLE TO FACILITATE FILM LOADING

(75) Inventors: Patricia L. Williams, Rochester; Dennis R. Zander, Penfield; Timothy J. Fuss, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/371,652

(22) Filed: Aug. 10, 1999

(51) Int. Cl.[7] .............................. G03B 17/02; G03B 1/00
(52) U.S. Cl. ............................. 396/535; 396/411
(58) Field of Search ........................... 396/411, 413, 396/514, 535, 543, 538

(56) References Cited

U.S. PATENT DOCUMENTS

| | | |
|---|---|---|
| 3,589,639 | 6/1971 | Engelsmann et al. ............... 396/538 |
| 3,602,121 | 8/1971 | Ernisse ................................ 396/536 |
| 4,363,547 | 12/1982 | Hashimoto et al. ................. 396/411 |
| 4,455,074 * | 6/1984 | Wong et al. ......................... 396/413 |
| 4,887,114 | 12/1989 | Yamamoto et al. ................. 396/536 |
| 5,105,211 | 4/1992 | Kameyama .......................... 396/536 |
| 5,530,509 | 6/1996 | Kuhn, Jr. et al. ................... 396/538 |
| 6,148,155 * | 11/2000 | Yasumaru ............................ 396/538 |

* cited by examiner

Primary Examiner—Christopher E. Mahoney
(74) Attorney, Agent, or Firm—Roger A. Fields

(57) ABSTRACT

A camera includes a rotatable film winder that coaxially engages a film spool to rotate the film spool in order to wind a filmstrip onto the film spool and that is retractable from the film spool to facilitate film loading into the camera, is characterized in that a flexible cord is connected to the film winder to be pulled to retract the film winder. Preferably, a chamber is provided for the film spool, a film door is closed to cover the chamber and is opened to uncover the chamber, and a latch member is movable into engagement with the film door to secure the film door closed and out of engagement with the film door to permit the film door to be opened and is connected with the flexible cord to pull the flexible cord to retract the film winder when the latch member is moved out of engagement with the film door.

13 Claims, 3 Drawing Sheets

CAMERA WITH FILM WINDER RETRACTABLE TO FACILITATE FILM LOADING

FIELD OF THE INVENTION

The invention relates generally to the field of photography, and in particular to a camera with a film winder that is retractable to facilitate film loading into the camera. More specifically, the invention relates to a film winder that is retracted when a film door is unlatched.

BACKGROUND OF THE INVENTION

It is generally known for a camera to include a rotatable film winder that coaxially engages the slightly protruding end of a film spool inside a film cartridge in the camera, to rotate the film spool in order to wind a filmstrip onto the film spool. The film spool is incrementally rotated after each exposure to wind successive exposed frames of the filmstrip into the film cartridge. Alternatively, the film spool is continuously rotated after the last exposure to wind the entire length of the filmstrip into the film cartridge. Typically, the film winder is retractable from the slightly protruding end of the film spool to facilitate film loading (or unloading), i.e. cartridge loading, into the camera.

Often, as described for example in prior art U.S. Pat. No. 3,602,121 issued Aug. 31, 1971, and U.S. Pat. No. 4,887,114 issued Dec. 12, 1989, a latch member is movable into engagement with a film door to a chamber for the film cartridge in order to secure the film door closed and is movable out of engagement with the film door in order to permit the film door to be opened for film loading. The latch member is mechanically connected with the film winder to retract the film winder from the slightly protruding end of the film spool when the latch part is moved out of engagement with the film door.

SUMMARY OF THE INVENTION

A camera comprising a rotatable film winder that coaxially engages a film spool to rotate the film spool in order to wind a filmstrip onto the film spool and that is retractable from the film spool to facilitate film loading into the camera, is characterized in that:

a flexible cord is connected to the film winder to be pulled to retract the film winder.

Preferably, a chamber is provided for the film spool, a film door is closed to cover the chamber and is opened to uncover the chamber, and a latch member is movable into engagement with the film door to secure the film door closed and out of engagement with the film door to permit the film door to be opened and is connected with the flexible cord to pull the flexible cord to retract the film winder when the latch member is moved out of engagement with the film door.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
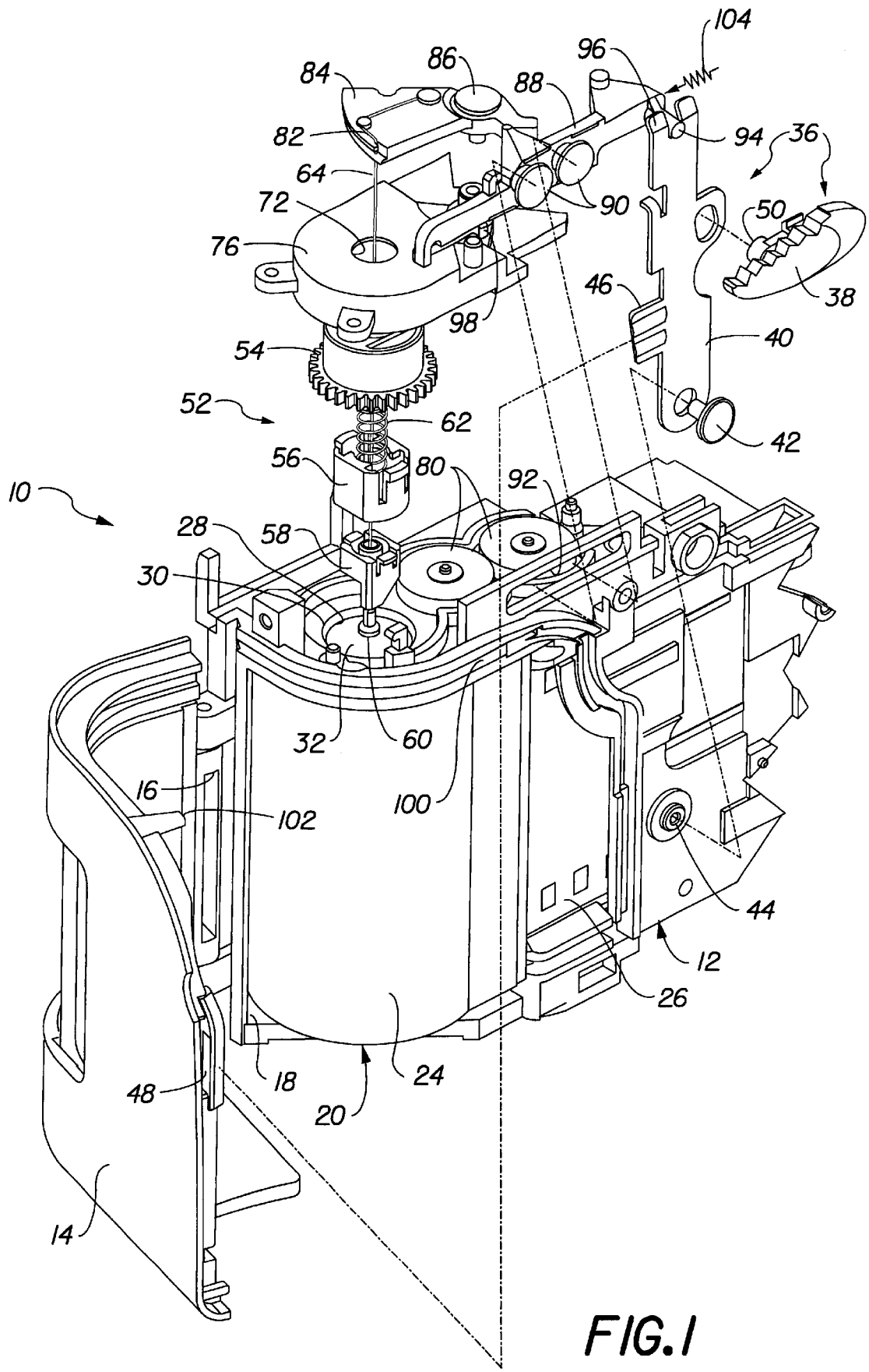
FIG. 1 is a rear exploded perspective view of a camera with a retractable film winder according to a preferred embodiment of the invention.

Referring now to the drawings, FIG. 1 shows a camera 10 including a main body part 12 and a rear film door 14. The film door 14 is pivotally connected to the main body part 12 via a hinge 16 for closing movement counter-clockwise in FIG. 1 to cover a cartridge receiving chamber 18 in the main body part and for opposite opening movement as shown in FIG. 1 to uncover the chamber. The chamber 18 is configured to receive a conventional film cartridge 20 having a rotatable flanged film spool 22, shown in FIG. 2, which is substantially inside a shell or housing 24 of the film cartridge. As is known, rotation of the film spool 22 clockwise in FIG. 1 draws a filmstrip 26 into the shell 24 by winding the filmstrip onto the film spool. An end 28 of the film spool 22 slightly protrudes from the shell 24 and projects towards, almost into, a top opening 30 in the main body part 12. The slightly protruding spool end 28 has a coaxial cavity 32. A tang 34 of the film spool 22 is positioned within the coaxial cavity 32 to be rotationally engaged in order to rotate the film spool 22. The tang 34 must be disengaged to permit the film cartridge 20 to be unloaded from the chamber 18. See FIGS. 2 and 3.

As shown in FIG. 1, a latching device 36 for securing the film door 14 closed includes a manual slide button 38 supported on the outside of the camera 10 via known means for sliding movement in opposite directions. A latch lever 40, pivotable in opposite directions, is connected to the main body part 12 with a pivot support pin 42 that is fixed in a mount hole 44 in the main body part. The latch lever 40 has a latch member or latch tab 46 that engagingly fits within an edge slot 48 in the film door 14 to secure the film door closed. The slide-button 38 is connected to the latch lever 40 with a pin 50 on the slide-button. Thus, when the slide-button 38 is manually moved to the right in FIG. 1 from an original position, the latch lever 40 is pivoted clockwise about the pivot support pin 42 to withdraw the latch member 46 from the edge slot 48. This permits the film door 14 to be opened in order to remove the film cartridge 20 from the chamber 18 and to load another (fresh) cartridge into the chamber.

Figure 2:
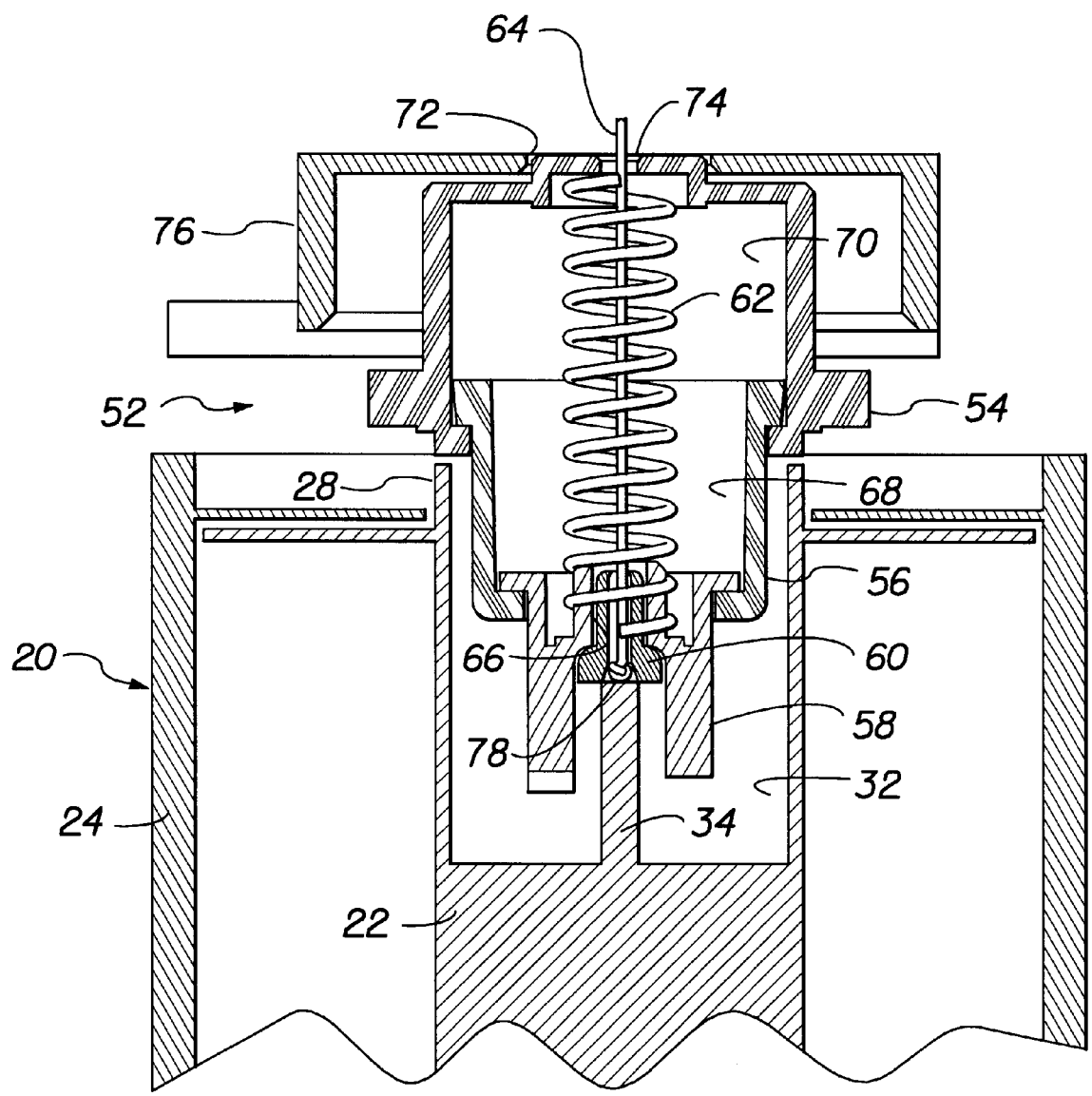
FIG. 2 is a cross-section view of the film winder shown extended to wind a filmstrip onto a film spool in the camera.

A rotatable film winder 52 for engaging the tang 34 of the film spool 22 to rotate the film spool in order to wind the filmstrip 26 onto the film spool includes several coaxial parts, a driven gear 54, a collar 56, a winding fork 58, an end piece 60, a helical compression spring 62, and a flexible cord or line 64. As shown in FIG. 2, the end piece 60 is captured within a center hole 66 in the winding fork 58. The winding fork 58 is the actual part of the film winder 52 that rotationally engages the tang 34 of the film spool 22, and it can be telescoped substantially inwardly and substantially outwardly of a central hollow 68 in the collar 56. Similarly, the collar 56 can be telescoped substantially inwardly and substantially outwardly of a central hollow 70 in the driven gear 54. The helical compression spring 62 is located in the central hollows 68 and 70 in the collar 56 and the driven gear 54, and serves as an expander spring in that it urges the winding fork 58 to telescope outwardly of the central hollow 68 in the collar 56 and urges the collar to telescope outwardly of the central hollow 70 in the driven gear 54. This is shown in FIG. 2. The flexible cord 64 longitudinally extends through concentric cord passage openings 72 and 74 in a top plate 76 on the main body part 12 and in the driven gear 54, through the successive coils of the helical compression spring 62, and is secured at a bottom end 78 in FIGS. 2 and 3 to the end piece 60. If the flexible cord 64 is pulled upwardly in FIG. 2, above the holes 72 and 74 in the top plate 76 and the driven gear 54, the winding fork 58 is telescoped substantially inwardly of the central hollow 68 in the collar 56, and the collar is telescoped substantially inwardly of the central hollow 70 in the driven gear. This retracts the film winder 52 to move the winding fork 58 out of engagement with the tang 34 of the film spool 22. See FIG. 3. Conversely, when the flexible chord 64 is released, the helical compression spring 62 returns the collar 56 substantially outwardly of the central hollow 70 in the driven gear 54, and it returns the winding fork 54 substantially outwardly of the central hollow 68 in the collar. This expands the film winder 52 to return the winding fork 58 to re-engagement with the tang 34 of the film spool 22. See FIG. 3.

A known series of motorized gears 80 serve to rotate the driven gear 54 to in turn rotate the collar 56 and the winding fork 58 in order to rotate the film spool 22 to wind the filmstrip onto the film spool.

Figure 3:
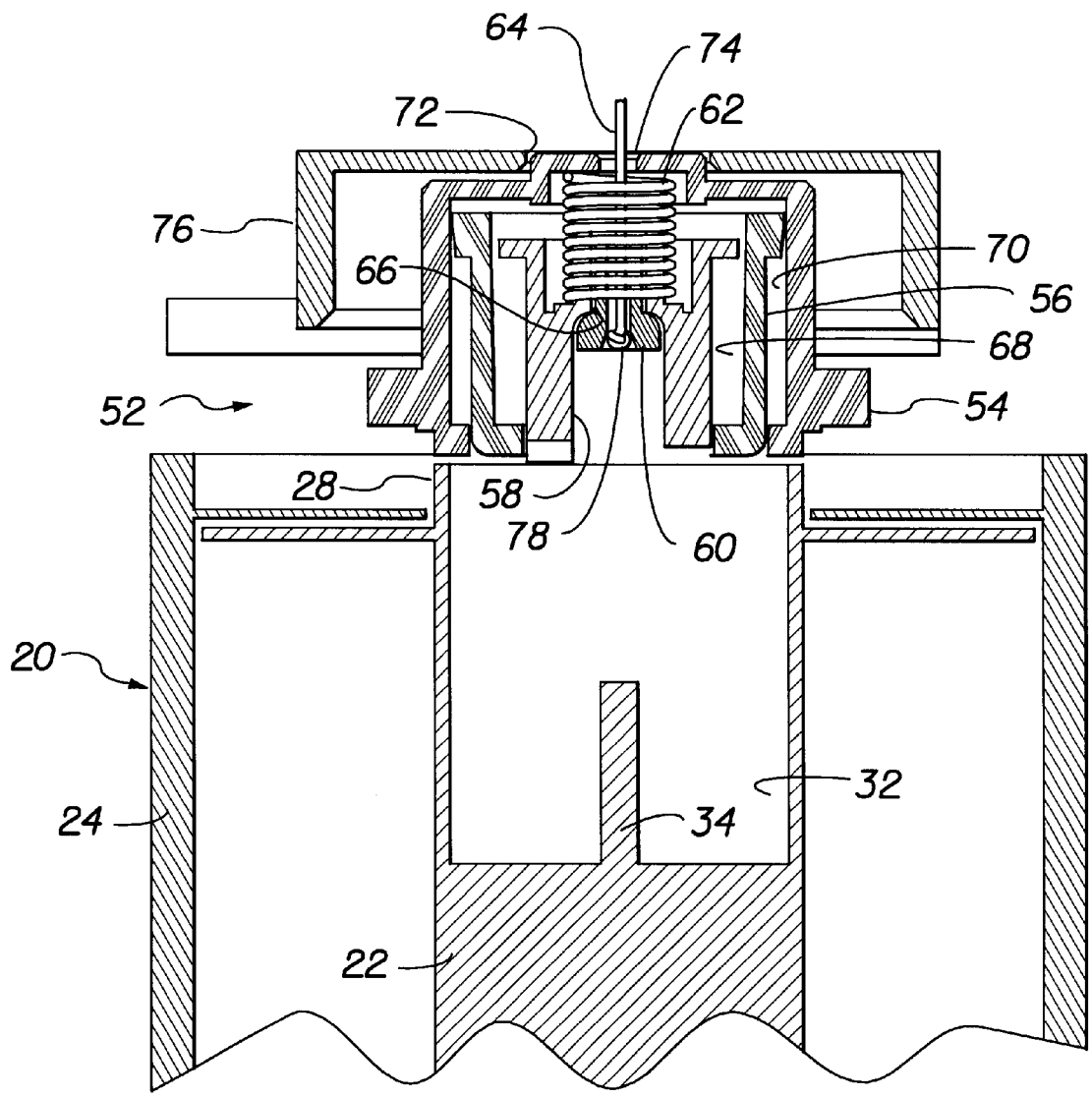
FIG. 3 is a cross-section of the film winder shown retracted to facilitate film loading into the camera.

A top end 82 of the flexible cord 64 is secured to a retractor 84 which is pivotably supported at an integral pivot pin 86 on the top plate 76. See FIG. 1. When the retractor 84 is pivoted counter-clockwise at the pivot pin 86 in FIG. 1, it pulls the flexible cord 64 upwardly in FIG. 3, above the cord passage holes 72 and 74 in the top plate 76 and the driven gear 54, to retract the film winder 52 as shown in FIG. 3. Conversely, when the retractor 84 is pivoted clockwise at the pivot pin 86 in FIG. 1, it releases the flexible cord 64 downwardly in FIG. 2 to allow the helical compression spring 62 to expand the film winder 52 as shown in FIG. 2.

An actuator slide 88 is supported on the main body part 12 via two pins 90 in a slot 92 for sliding movement in opposite directions parallel to the directions of movement of the slide button 38. The latch lever 40 is coupled with the actuator slide 88 at a pin 94 in a yoke 96 to make pivotal movement of the latch lever clockwise about the pivot support pin 42 in FIG. 1 move the actuator slide to the right, to in turn pivot the retractor 84 counter-clockwise at the pivot pin 86. Thus, when the slide-button 38 is manually moved to the right in FIG. 1, the latch lever 40 is pivoted clockwise to withdraw the latch member 46 from the edge slot 48 in the film door 14, which permits the film door to be opened, and the retractor 84 is pivoted counter-clockwise to pull the flexible cord 64 to retract the film winder 52 as shown in FIG. 3.

The actuator slide 88 has a flexible detent 98 that is temporarily engaged with a common catch (not shown) within a cavity 100 in the main body part 12 immediately when the actuator slide reaches the end of its movement to the right in FIG. 1. This is done to maintain the film winder 52 retracted as shown in FIG. 3, which permits the film cartridge 20 to be removed from the chamber 18 when the film door 14 is open. Closing the film door 14 swings a rigid release projection 102 on the film door into the cavity 100 to separate the flexible detent 98 from the catch. Then, a return spring 104 moves the actuator slide 88 to the left in FIG. 1, which permits a torsion spring (not shown) to pivot the retractor 84 clockwise to release the flexible cord 64 to allow the helical compression spring 62 to expand the film winder 52 as shown in FIG. 2. Movement of the actuator slide to the left in FIG. 1 pivots the latch lever 42 counter-clockwise to return the latch member 46 into the edge slot 48 in the film door 14, which secures the film door closed, and moves the slide button to the left to its original position.

The invention has been described with reference to a preferred embodiment. However, it will be appreciated that variations and modifications can be effected by a person of ordinary skill in the art without departing from the scope of the invention.

PARTS LIST 10. camera
12. main body part
14. rear film door
16. hinge
18. cartridge receiving chamber
20. film cartridge
22. film spool
24. shell
26. filmstrip
28. protruding spool end
30. top opening
32. coaxial cavity
34. tang
36. latching device
38. manual slide button
40. latch lever
42. pivot support pin
44. mount hole
46. latch member
48. edge slot
50. pin
52. film winder
54. driven gear
56. collar
58. winding fork
60. end piece
62. helical compression spring
64. flexible cord
66. center hole
68. central hollow
70. central hollow
72. cord passage opening
74. cord passage opening
76. top plate
78. cord bottom end
80. motorized gears
82. top cord end
84. retractor
86. pivot pin
88. actuator slide
90. pins
92. slot
94. pin
96. yoke
98. flexible detent
100. cavity
102. rigid release projection
104. return spring

What is claimed is:

1. A camera comprising a rotatable film winder that coaxially engages a film spool to rotate the film spool in order to wind a filmstrip onto the film spool and that is retractable from the film spool to facilitate film loading into said camera, is characterized in that:
a flexible cord is connected to said film winder to be pulled to retract said film winder.

2. A camera as recited in claim 1, wherein a chamber is provided for the film spool, a film door is closed to cover said chamber and is opened to uncover said chamber, and a latch member is movable into engagement with said film door to secure said film door closed and out of engagement with said film door to permit said film door to be opened and is connected with said flexible cord to pull said flexible cord to retract said film winder when said latch member is moved out of engagement with said film door.

3. A camera as recited in claim 1, wherein said film winder includes several coaxially telescoping parts which telescope inwardly of one another to retract said film winder and outwardly of one another to expand.

4. A camera as recited in claim 3, wherein said coaxially telescoping parts include a winding fork that coaxially engages the film spool and a driven gear that is rotationally driven to rotate each one of said coaxially telescoping parts.

5. A camera as recited in claim 3, wherein said coaxially telescoping parts have respective center holes, and said flexible cord longitudinally extends through said center holes.

6. A camera as recited in claim 3, wherein said flexible cord when pulled causes said coaxially telescoping parts to telescope inwardly, and a coaxial spring urges said coaxially telescoping parts to telescope outwardly.

7. A camera as recited in claim 3, wherein said coaxially telescoping parts include a winding fork that coaxially engages the film spool and a driven gear that is rotationally driven to rotate each one of said coaxially telescoping parts and has a center hollow for receiving said winding fork when said coaxially telescoping parts are telescoped inwardly.

8. A camera as recited in claim 7, wherein said flexible cord longitudinally extends through said center hollow to said winding fork in order to draw said winding fork into said center hollow when said flexible cord is pulled.

9. A camera as recited in claim 8, wherein a helical compression spring is coiled around said flexible cord within said center hollow and urges said winding fork to telescope outwardly of said center hollow.

10. A camera as recited in claim 1, wherein a retractor is pivotable to pull said flexible cord in order to retract said film winder.

11. A rotatable film winder for coaxially engaging a film spool to rotate the film spool in order to wind a filmstrip onto the film spool in a camera, is characterized in that:

said film winder includes several coaxially telescoping parts which telescope inwardly of one another to retract said film winder from the film spool and outwardly of one another to expand the film winder into coaxial engagement with the film spool; and a flexible cord is connected to said film winder to be pulled to retract said film winder.

12. A method of retracting a rotatable film winder out of coaxial engagement with a film spool in a camera, said method comprising the step:

pulling a flexible cord connected to the film winder in order to retract the film winder.

13. A method as recited in claim 12, further comprising the step:

telescoping one part of the film winder inwardly of another part of the film winder to retract the film winder when the flexible cord is pulled.

* * * * *